(12) United States Patent
Douthat et al.

(10) Patent No.: US 10,579,566 B2
(45) Date of Patent: Mar. 3, 2020

(54) POINT OF SALE DEVICE WITH SWITCHABLE INTERNAL CONNECTION ROLES

(71) Applicant: Square, Inc., San Francisco, CA (US)

(72) Inventors: Cory Douthat, San Francisco, CA (US); David Donovan, Berkeley, CA (US); Matthew H. Maibach, San Francisco, CA (US); John Kelley, San Francisco, CA (US); Zachary Crosby, Westmont, IL (US)

(73) Assignee: SQUARE, INC., San Francisco, CA (US)

( * ) Notice: Subject to any disclaimer, the term of this patent is extended or adjusted under 35 U.S.C. 154(b) by 10 days.

(21) Appl. No.: 15/582,174

(22) Filed: Apr. 28, 2017

(65) Prior Publication Data

US 2018/0314661 A1 Nov. 1, 2018

(51) Int. Cl.
*G06F 13/40* (2006.01)
*G06F 13/42* (2006.01)
*G06F 13/38* (2006.01)

(52) U.S. Cl.
CPC ........ *G06F 13/4022* (2013.01); *G06F 13/385* (2013.01); *G06F 13/426* (2013.01); *G06F 13/4282* (2013.01)

(58) Field of Classification Search
CPC .................................................. G06Q 2240/00
See application file for complete search history.

(56) References Cited

U.S. PATENT DOCUMENTS 4,758,714 A 7/1988 Carlson et al.
5,752,046 A 5/1998 Oprescu et al.
(Continued)

FOREIGN PATENT DOCUMENTS

DE 201 22 899 U1 9/2009
EP 2 965 167 A1 1/2016
(Continued)

OTHER PUBLICATIONS

Non-Final Office Action dated Jul. 28, 2017, for U.S. Appl. No. 15/597,035, of Douthat, C., et al., filed May 16, 2017.
(Continued)

*Primary Examiner* — Henry Tsai
*Assistant Examiner* — Juanito Borromeo
(74) *Attorney, Agent, or Firm* — Polsinelli PC—Square

(57) ABSTRACT

A point-of-sale (POS) device includes a processor, a universal serial bus (USB) hub, two switches, and an external connector that connects the POS device to a secondary device with its own second processor. In a primary mode, the processor is connected to a host connector of the USB hub and the secondary device is connected to a first peripheral connector of the USB hub via the external connector. In a secondary mode, the processor is connected to the first peripheral connector of the USB hub and the secondary device is connected to the host connector of the USB hub via the external connector. The processor controls the switch from the primary mode to the secondary mode, and vice versa, by transmitting control signals to control pins of the two switches, and optionally by transmitting a reset signal to a reset pin of the USB hub.

20 Claims, 6 Drawing Sheets

(56) References Cited

U.S. PATENT DOCUMENTS

| | | | |
|---|---|---|---|
| 7,124,937 B2* | 10/2006 | Myers | G06Q 20/027 |
| | | | 235/380 |
| 7,506,956 B2 | 3/2009 | Usui | |
| 8,553,055 B1 | 10/2013 | Martell et al. | |
| 9,092,766 B1 | 7/2015 | Bedier et al. | |
| 9,223,376 B2 | 12/2015 | Derbyshire et al. | |
| 9,489,703 B2 | 11/2016 | Kauniskangas et al. | |
| 9,529,758 B1 | 12/2016 | Szeto | |
| 9,590,747 B2 | 3/2017 | Thoukydides et al. | |
| 10,140,604 B1 | 11/2018 | Douthat et al. | |
| 10,182,328 B1 | 1/2019 | Maibach et al. | |
| 2003/0200108 A1 | 10/2003 | Malnoe | |
| 2004/0088449 A1 | 5/2004 | Sakaki | |
| 2006/0056401 A1* | 3/2006 | Bohm | G06F 13/4022 |
| | | | 370/360 |
| 2008/0238687 A1 | 10/2008 | Ozer et al. | |
| 2012/0060041 A1 | 3/2012 | Hashimoto | |
| 2013/0262708 A1* | 10/2013 | McLeod | G06F 13/4252 |
| | | | 710/2 |
| 2014/0021254 A1 | 1/2014 | Marshall et al. | |
| 2014/0127995 A1 | 5/2014 | Hendricksen et al. | |
| 2014/0191913 A1 | 7/2014 | Ge et al. | |
| 2014/0206339 A1 | 7/2014 | Lindoff | |
| 2014/0249942 A1 | 9/2014 | Hicks et al. | |
| 2014/0295777 A1 | 10/2014 | Wang | |
| 2015/0227485 A1 | 8/2015 | Maung et al. | |
| 2015/0269805 A1 | 9/2015 | Korala | |
| 2016/0125376 A1 | 5/2016 | Beatty et al. | |
| 2016/0211843 A1 | 7/2016 | Wang | |
| 2016/0307010 A1 | 10/2016 | Ge et al. | |
| 2016/0307171 A1 | 10/2016 | Haga | |
| 2017/0017943 A1 | 1/2017 | Bilhan et al. | |
| 2017/0255927 A1 | 9/2017 | Dorsey et al. | |
| 2018/0026373 A1 | 1/2018 | Schwent et al. | |
| 2018/0316815 A1 | 11/2018 | Douthat et al. | |

FOREIGN PATENT DOCUMENTS

| | | |
|---|---|---|
| WO | 2018/200730 A1 | 11/2018 |
| WO | 2018/200732 A1 | 11/2018 |

OTHER PUBLICATIONS

Final Office Action dated Jan. 12, 2018, for U.S. Appl. No. 15/597,035, of Douthat, C., et al., filed May 16, 2017.

Non-Final Office Action dated Apr. 16, 2018, for U.S. Appl. No. 15/620,642, of Maibach, M.H., et al., filed Jun. 12, 2017.

International Search Report and Written Opinion for International Application No. PCT/US2018/029451, dated Sep. 17, 2018.

International Search Report and Written Opinion for International Application No. PCT/US2018/029449, dated Jul. 31, 2018.

Notice of Allowance dated Jul. 18, 2018, for U.S. Appl. No. 15/597,035, of Douthat, C., et al., filed May 16, 2017.

Notice of Allowance dated Sep. 6, 2018, for U.S. Appl. No. 15/620,642, of Maibach, M.N., et al., filed Jun. 12, 2017.

* cited by examiner

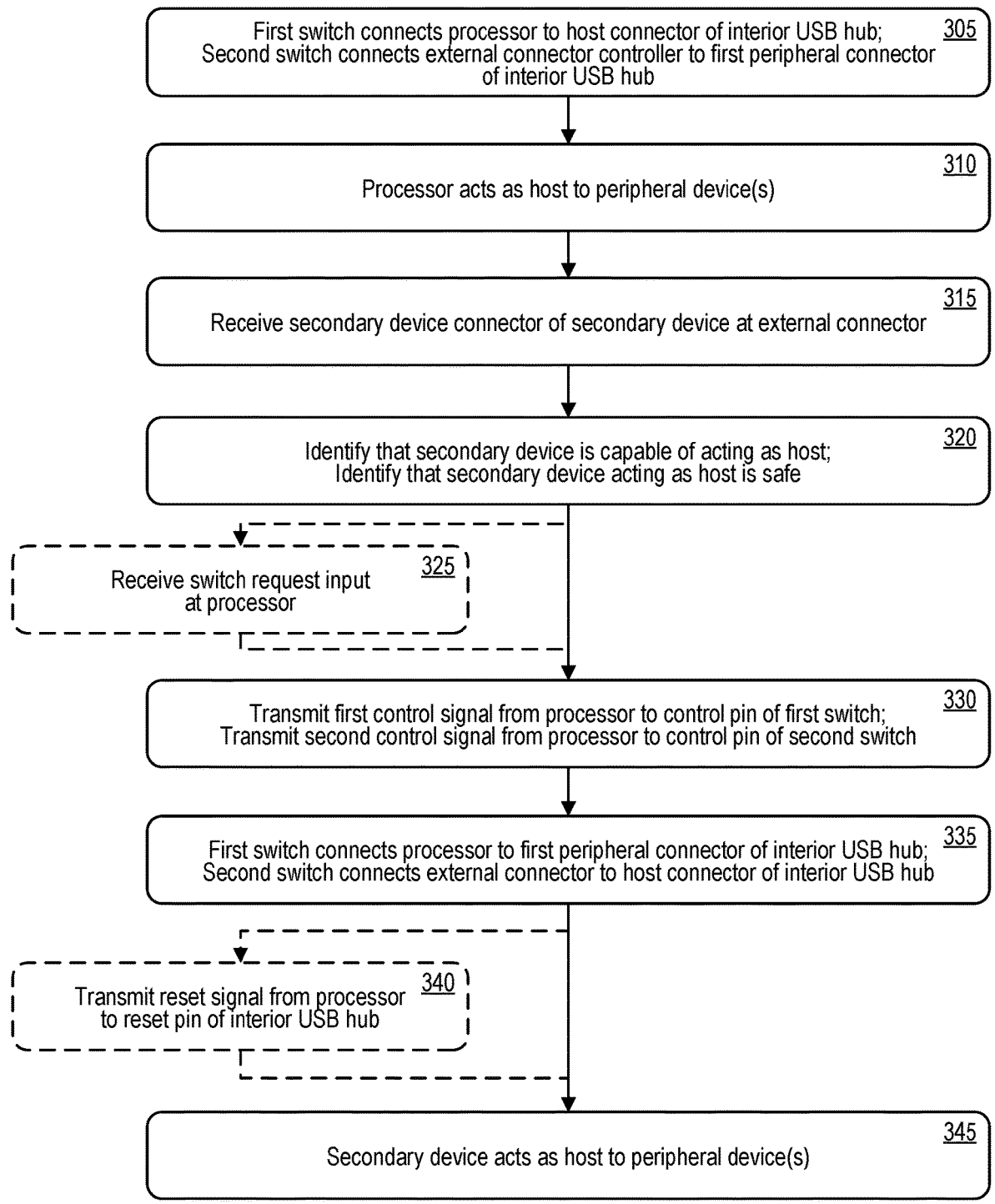

POINT OF SALE DEVICE WITH SWITCHABLE INTERNAL CONNECTION ROLES

BACKGROUND

A point-of-sale ("POS") device can include various components, such as a processor, a card reader, a network connection interface, and a receipt printer. Card readers are typically built to read transaction information from cards, such as credit cards or debit cards.

When two devices are connected via a universal serial bus ("USB") connection, one device acts as the host and the other acts as a peripheral device. The host typically initiates all communication across the connection, while the peripheral device is typically limited to responding when requested by the host. In a typical USB connection, these connection roles cannot be reversed once connected—that is, the host device cannot become the peripheral device, and the peripheral device cannot become the host device. Peripheral devices may be "smart," in that they are also capable of being host devices if connected differently, or "dumb," in that they are only ever capable of being peripheral devices.

A host device can connect to multiple peripheral devices simultaneously via a USB hub. A USB hub typically includes one host connector that connects to a host device and multiple peripheral connectors that each connect to peripheral devices. In a typical USB hub, these connection roles cannot be reversed once connected—that is, the host device cannot become any of the peripheral devices, and none of the peripheral devices can become the host device. Even if it would be advantageous for a "smart" peripheral device to have access to other peripheral devices connected to the hub, this is impossible in a typical USB hub, as only the host has access to any of the peripheral devices.

The USB On-The-Go ("USB OTG") and USB Type-C standards gave USB connections an additional ID pin and was developed to allow two devices linked over a USB connection to allow the two devices to switch host or peripheral roles. However, USB OTG and USB Type-C connections only permit role swapping when a single host device is connected to a single peripheral device, and do not permit role swapping through a hub, where specific USB ports or USB plugs of the hub are typically permanently assigned to a host or peripheral role.

Thus, there is a need in the art for role swapping circuitry for USB hub systems.

BRIEF DESCRIPTION OF THE DRAWINGS

FIG. 3A is a flow diagram illustrating a switch from using a processor of a point-of-sale (POS) device in a host role to using a secondary device in the host role.

DETAILED DESCRIPTION

A point-of-sale (POS) device includes a processor, a universal serial bus (USB) hub, two switches, and an external connector that connects the POS device to a secondary device with its own second processor. In a primary mode, the processor is connected to a host connector of the USB hub and the secondary device is connected to a first peripheral connector of the USB hub via the external connector. In a secondary mode, the processor is connected to the first peripheral connector of the USB hub and the secondary device is connected to the host connector of the USB hub via the external connector. The processor controls the switch from the primary mode to the secondary mode, and vice versa, by transmitting control signals to control pins of the two switches, and optionally by transmitting a reset signal to a reset pin of the USB hub.

Figure 1:
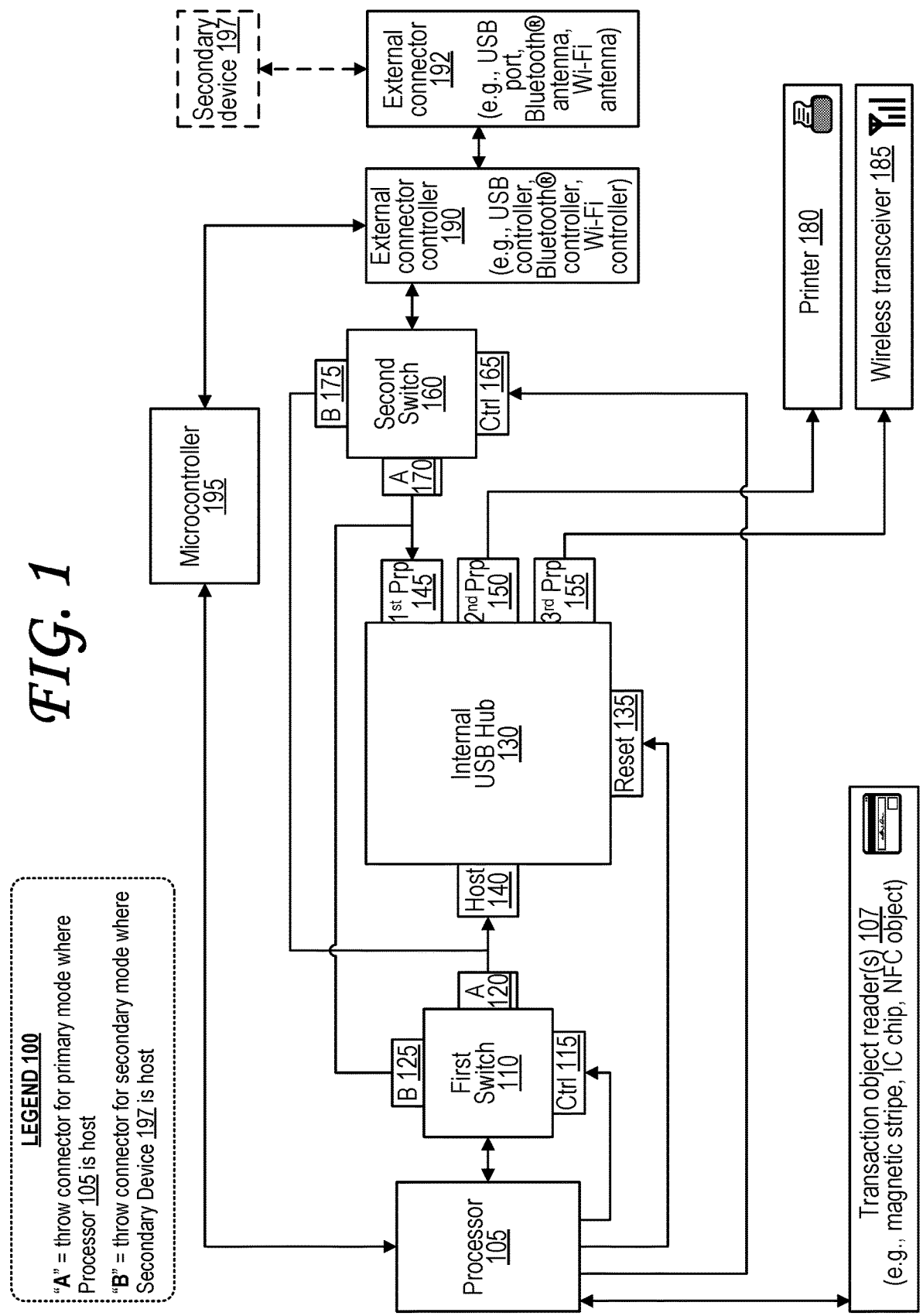
FIG. 1 is a circuit diagram of role-switching circuitry in a point-of-sale (POS) device with switchable internal connection roles.

FIG. 1 is a circuit diagram of role-switching circuitry in a point-of-sale (POS) device with switchable internal connection roles.

The circuit diagram of FIG. 1 identifies a number of components of the POS device, including a processor 105, one or more transaction object reader(s) 107, an internal Universal Serial Bus (USB) hub 130, a first switch 110, a second switch 160, a microcontroller 195, a printer 180, an wireless transceiver 185, and an external connector controller 190 with an external connector 192.

The processor is coupled to one or more transaction object reader(s) 107. The transaction object reader(s) 107 may include a magnetic stripe reader 235, an integrated circuit (IC) chip reader 225, a near field communication (NFC) reader, or some combination thereof. The magnetic stripe reader 235 reads transaction data from a magnetic stripe of a transaction object. The IC chip reader 225 reads transaction data from an IC chip of a transaction object. The IC chip may be a chip following Europay/Mastercard/Visa ("EMV") standards, also known as an EMV chip. The NFC reader reads transaction data from wireless NFC signals received from a transaction object. The transaction object may be a transaction card, such as a credit card or a debit card. The transaction object may be any type of NFC-capable device, such as an active NFC tag, a passive NFC tag, or a computer system 500 as described with respect to FIG. 5. In some cases, multiple transaction object readers 107 may share components—for example, the IC chip reader 225 and the NFC reader may share a contactless antenna. Once the transaction object reader(s) 107 retrieve the transaction data from the transaction object, the transaction object reader(s) 107 send the transaction data to the processor 105. The transaction object reader(s) 107 sometimes modify or encrypt the transaction data before sending it to the processor 105.

The external connector controller 190 may include one or more of a Universal Serial Bus (USB) controller, a general purpose input/output (GPIO) controller, an Ethernet controller, a Local Area Network (LAN) controller, a Wide Area Network (WAN) controller, a Bluetooth® controller, a Bluetooth® Low Energy (BLE) controller, an 802.11 Wi-Fi controller, a Wireless Local Area Network (WLAN) controller, a Wireless Wide Area Network (WWAN) controller, another type of wireless or wired communication controller, or some combination thereof. When the external connector controller 190 includes a USB controller, the external connector 192 may include one or more USB connectors, such as female USB port(s) or a male USB plug(s), or may include one or more conductive traces or conductive pins on a printed circuit board (PCB), or some combination thereof.

When the external connector controller 190 includes a GPIO controller, the external connector 192 may include one or more GPIO pins or conductive traces of a PCB. When the external connector controller 190 includes a Bluetooth® controller and/or a Bluetooth® Low Energy (BLE) controller, the external connector 192 may be a Bluetooth® wireless transceiver or a Bluetooth® Low Energy (BLE) wireless transceiver. When the external connector controller 190 includes a 802.11 Wi-Fi controller or WLAN/WWAN controller, the external connector 192 may be a Wi-Fi or WLAN or WWAN antenna/transceiver/router, which may be used to set up a private wireless local area network (WLAN) or a wireless wide area network (WWAN) between the POS device and the secondary device 197 or a Wi-Fi/WLAN/WWAN direct data transfer connection between the POS device and the secondary device 197.

A secondary device 197 may connect to the external connector 192, either via a physical connection through the USB connector 192, or via a wireless connection through the Bluetooth® or Bluetooth® low energy (BLE) or Wi-Fi antenna 192. The secondary device 197 may be a "dumb" device that is only suitable to be a peripheral device, or may be a "smart" device that can function as a host device, such as a computer system 500 or a device including one or more components of a computer system 500. In some cases, the secondary device 197 may be another POS device. While a single external connector 192 is illustrated in FIG. 1, it should be understood that the external connector controller 190 may be connected to multiple external connectors 192, as in an externally-facing USB hub with multiple USB connectors 192, or a USB connector 192 as well as a Bluetooth® and/or Bluetooth® Low Energy (BLE) antenna, or some combination thereof.

Figure 5:
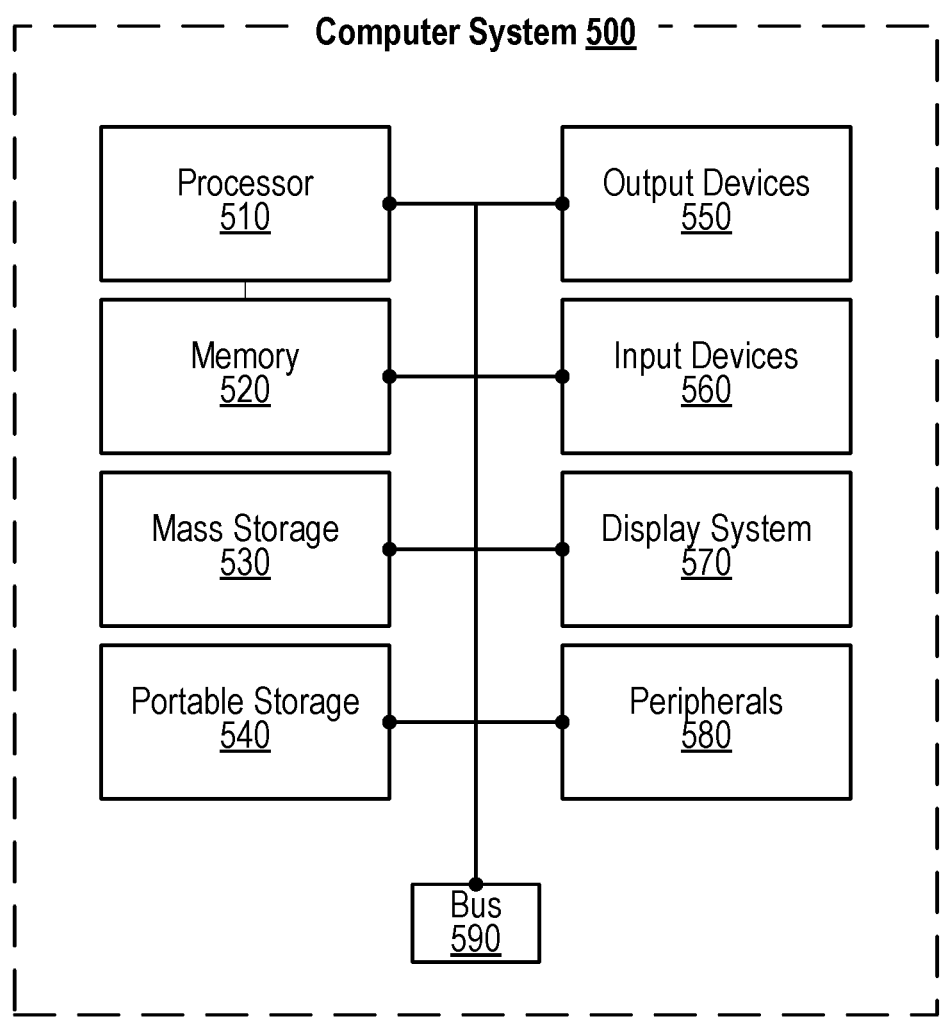
FIG. 5 is a block diagram of an exemplary computing device that may be used to implement an embodiment of the present invention.

In embodiments where the external connector 192 includes a wireless antenna or other transceiver such as any of those discussed in the paragraphs above or with respect to FIG. 5, the external connector controller 190 may include, in additional to a wireless controller, a Universal Serial Bus (USB) controller and/or other USB circuitry to convert the signal coming from the external connector 192 to a USB signal. In this way, the external connector controller 190 can safely be connected to the first peripheral connector 145 of the internal USB hub 130 in the primary mode, or to the host connector 140 of the internal USB hub 130 in the secondary mode. For example, the external connector 192 and external connector controller 190 may include a wireless transceiver plugged into a USB port.

The internal USB hub 130 of FIG. 1 includes a host connector 140, a first peripheral connector 145, a second peripheral connector 150, and a third peripheral connector 155. It should be understood that the second peripheral connector 150 and third peripheral connector 155 of the internal USB hub 130 can be removed in some cases, and that one or more additional peripheral connectors may be added in addition to those pictured in FIG. 1. The internal USB hub 130 may also include a reset pin 135, which may perform a reset function of the internal USB hub 130 upon receiving a reset signal from the processor 105. The reset function forces the internal USB hub 130 to re-identify and restart connections with the devices attached to its host and peripheral connectors. The host connector 140 and the peripheral connectors 145/150/155 may each be female USB ports, male USB plugs, conductive traces running along a surface of a PCB, conductive pins on a surface of a PCB, or some combination thereof. That is to say, though USB standards may be used the internal USB hub 130 may be implemented partially or entirely on a PCB, with host connector 140 and the peripheral connectors 145/150/155 exclusively using conductive traces or pins without any traditional ports or plugs, thereby saving space within the POS device 205. The internal USB hub 130 and external connector 192 and external connector controller 190 may use any USB standard, including USB Type-A, USB Type-B, USB Type-C, USB 1.x, USB 2.x, USB 3.x, USB 4.x, Thunderbolt, USB mini, USB micro, USB On-The-Go (OTG), any other USB standard, or some combination thereof. The second peripheral connector 150 of FIG. 1 is connected to a printer 180, while the third peripheral connector 155 of FIG. 1 is connected to a wireless transceiver device 185. It should be understood that the printer 180 and the wireless transceiver device 185 illustrated in FIG. 1 are exemplary peripheral devices, and that other peripheral devices can be connected to the second peripheral connector 150 and third peripheral connector 155 and any additional peripheral connector(s) of the internal USB hub 130 not illustrated in FIG. 1. For example, any of the peripheral devices 580 discussed with respect to FIG. 5 may be connected to these peripheral connectors of the internal USB hub 130.

Within the circuit diagram of FIG. 1, the processor 105 is coupled to the internal USB hub 130 via the first switch 110. The external connector controller 190 is coupled to the internal USB hub 130 via the second switch 160, effectively coupling the secondary device to the USB hub 130 via the external connector 192. The first switch 110 and second switch 160 are used to control a switching of the POS device between a primary mode and a secondary mode.

In the primary mode, the processor 105 is connected to a host connector 140 of the internal USB hub 130, and the external connector controller 190 is connected to the first peripheral connector 145 of the USB hub. In a secondary mode, the processor 105 is connected to the first peripheral connector 145 of the internal USB hub 130, and the external connector controller 190 is connected to the host connector 140 of the internal USB hub 130. In effect, the processor 105 plays the host device role in the primary mode, while the secondary device 197 plays the host device role in the secondary mode via the external connector 192 and the external connector controller 190.

A pole connector of the first switch 110 is connected to the processor 105. A pole connector of the second switch 160 is connected to the external connector controller 190. As indicated in the legend 100, the first switch 110 and second switch 160 both include a first throw connector associated with the primary mode, marked "A 120" and "A 170" in FIG. 1, respectively. As also indicated in the legend 100, the first switch 110 and second switch 160 both include a second throw connector associated with the secondary mode, marked "B 125" and "B 175" in FIG. 1, respectively.

This switch between the primary mode and the secondary mode is triggered by the processor sending out a first control signal, a second control signal, and optionally a reset signal. At the first switch 110, the switch between the primary mode and the secondary mode is triggered by receipt of a first control signal at the control pin 115 of the first switch 110. At the second switch 160, the switch between the primary mode and the secondary mode is triggered by receipt of a second control signal at the control pin 165 of the second switch 160. At the internal USB hub 130, the switch between the primary mode and the secondary mode can optionally be triggered by receipt of one or more reset signal(s) at the reset pin 135 of the internal USB hub 130. The two control signals are sent by the processor 105 approximately simultaneously; that is, the processor 105 sends the one control signal within a threshold amount of time from sending the other. The processor 105 can send the reset signal before it sends the control signals, after it sends the control signals, in between sending the two control signals, or some combination thereof. The processor 105 can in some cases send the reset signal twice or three times both before and after it sends the control signal and optionally between sending one control signal and the other. In some cases, the reset pin 135 and reset signal(s) may be omitted entirely. The sending of the reset signal(s) can depend on how the reset function of the internal USB hub 130 operates and how long the reset function takes to complete. The processor 105 can send the reset signal(s) within a threshold amount of time from sending either or both of the control signals.

The processor 105 can be triggered to send the control signals and/or reset signal(s) either automatically when the secondary device 197 is connected or in response to a switch request input. The processor 105 may receive the switch request input from the secondary device 197, from the external connector controller 190, from the microcontroller 192, from an input interface such as any discussed in reference to input devices 560 of FIG. 5, or some combination thereof. For example, a user might indicate via a user interface displayed on a touch-sensitive display screen 210 connected to the processor 105, or via a user interface displayed on a touch-sensitive display screen 210 of the secondary device 197, that a switch from the primary mode to the secondary mode should occur, or vice versa. The processor 105 can receive switch request input from the microprocessor 195 after the microprocessor 195 determines that the secondary device 197 can safely be given the host role.

The processor 105 may be any type of processor 510 identified with respect to FIG. 5, and may be in some cases be part of, or include, an application-specific integrated circuit (ASIC). While the processor 105 and microcontroller 195 are illustrated as separate components in FIG. 1, the microcontroller 195 may in some cases be combined with the processor 105 into a single component. It should be understood that any actions described herein as being performed by the microcontroller 195 can alternately or additionally be performed by the processor 105. In some cases, also, actions described herein as being performed by the processor 105 can alternately or additionally be performed by the microcontroller 195.

The microcontroller 195 can be any type of processor 510 identified with respect to FIG. 5, and may be in some cases be part of, or include, an application-specific integrated circuit (ASIC). The microcontroller 195 can communicate or negotiate with the secondary device 197 to identify whether or not it is safe to swap roles from the primary mode to the secondary mode, so that the secondary device 197 is given the host role. This can entail receipt of information from the secondary device 197, such as a device identifier, a product identifier, a device type/class identifier, identifiers of particular components, or a host capability identifier. The device identifier can identify the secondary device 197 in particular, such as by a device serial number or a signature based on a certificate that is verifiable by a certificate authority. The product identifier can identify the product that the secondary device 197 is, such as a particular model of card reader or computer system 500. The device type identifier can identify a device type of the product that the secondary device 197 is, such as "POS device," "card reader," "storage device," or "computer system." The identifiers of particular components can identify components of the secondary device 197 particularly, by model, or by component type. The host capability identifier can simply be an identifier that notes whether or not the secondary device 197 is capable of playing a host role. Any combination of these identifiers can be checked by the microcontroller 195 against a whitelist, a blacklist, or both. In some cases, the whitelists and blacklist may be updated periodically by synchronizing over a network connection with versions of the whitelists/blacklists stored on a remote server. This way, the microcontroller can refuse to connect with secondary devices 197 characterized by identifiers associated with faulty host role connections, defects, or records of past malicious activity. Information may be passed between the secondary device 197 and the external connector controller 190 via the external connector 192 over one or more Side Band Use (SBU) signal(s), one or more Vendor Defined Message (VDM) signal(s), or some combination thereof.

In some cases, the transfer of information between the secondary device 197 and the microcontroller 195 may include a key exchange of symmetric keys, asymmetric public keys, asymmetric private keys, or some combination thereof. The information may be encrypted at the secondary device 197 and decrypted at the microcontroller 195 and/or processor 105, or vice versa. The information transferred in either direction may include a signature based on a certificate that is verifiable by a certificate authority. Such steps may be used to allow identity verification to ensure that both devices are what they claim to be, and to ensure security of transfer of information, particularly when the external connector 192 is a wireless signal antenna.

Figure 2:
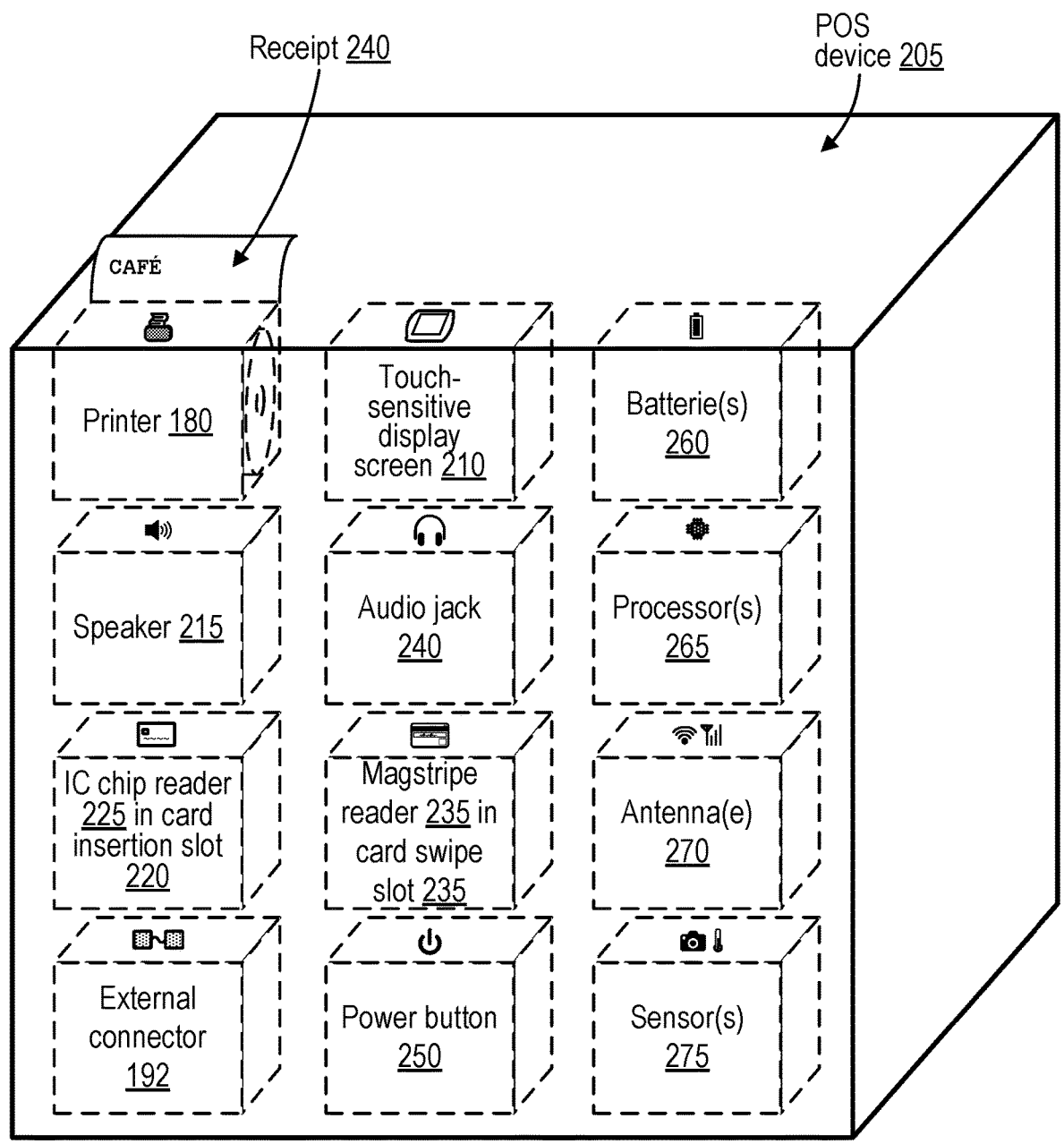
FIG. 2 is a perspective view of a point-of-sale (POS) device.

By channeling communications from the external connector controller 190 through the microcontroller 195 rather than going directly to the processor 105, the microcontroller 195 can perform all security and identity verification functions, freeing up the processor 105 can be freed up to work with the transaction object reader(s) 107, peripherals such as the printer 180 and wireless transceiver 185, and other components of the POS device, such as the touch-sensitive display screen 210 illustrated in FIG. 2

Channeling communications from the external connector controller 190 through the microcontroller 195 also allows the microcontroller 195 to trigger an Emergency Download Mode ("EDL Mode") that allows the processor to safely undergo a firmware update triggered by the secondary device 197. In this way an others, the circuitry illustrated in FIG. 1 can be useful for updating the POS device, development of the POS device, debugging of the POS device, and factory testing of the POS device. It can also allow two POS devices to be linked, which can allow a first POS device to fix any software issues in the second POS device, or can allow a first POS device with a faulty hardware component to the corresponding hardware component of the second POS device.

The printer 180 may be used to print receipts, coupons, barcodes, quick-response ("QR") codes, or some combination thereof. The printer 180 may be a thermal printer, a direct thermal printer, a thermal transfer thermal printer, a solid-ink "phaser" printer, an inkjet printer, a thermal inkjet ("bubblejet") printer, a continuous inkjet printer, a piezoelectric inkjet printer, a dye-sublimation printer, a laser printer, an LED printer, or some combination thereof.

The first switch 110 and second switch 160 may each include one or more multiplexers, one or more demultiplexers, or some combination thereof. The first switch 110 and second switch 160 may each include one or more transistors.

The wireless transceiver 185 may include a 802.11 Wi-Fi antenna, a Bluetooth® antenna, a Bluetooth® Low Energy (BLE) antenna, a cellular network antenna, a Near Field Communication (NFC) antenna, a radio frequency identification (RFID) antenna, a WLAN/WWAN antenna, an antenna for any other type of communication discussed with respect to FIG. 5, or some combination thereof. It may also include controller circuitry allowing the antenna to act as a receiver, transmitter, or transceiver. By making the wireless transceiver 185 a peripheral device, the secondary device 197 can use the wireless transceiver 185 in the secondary mode where the secondary device 197 is host, allowing a secondary device 197 with a defective or missing antenna networking capabilities.

FIG. 2 is a perspective view of a point-of-sale (POS) device.

Figure 4:
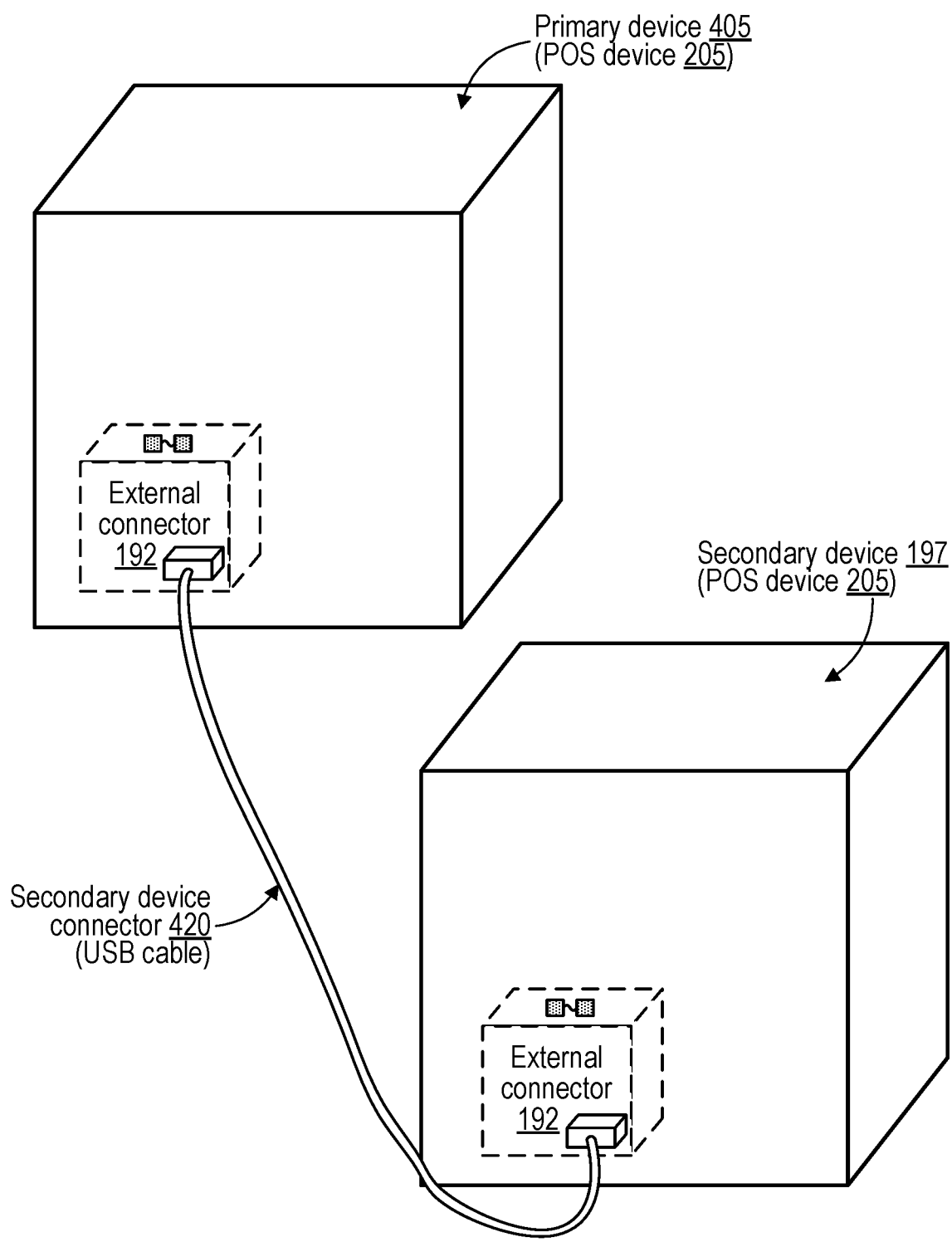
FIG. 4 illustrates a primary point-of-sale (POS) device connected to a secondary point-of-sale (POS) device.

The POS device 205 of FIG. 2 is the same POS device 205 of FIG. 4. The POS device 205 of FIG. 2 may include at least a subset of the circuitry illustrated in FIG. 1 or discussed with respect to FIG. 1, and optionally may include at least a subset of the circuitry illustrated in FIG. 5 or discussed with respect to FIG. 5.

The POS device 205 of FIG. 2 may include one or more batteries 260, which may include one or more rechargeable batteries, one or more non-rechargeable batteries, or some combination thereof. In some cases, one battery may act as a "main" battery, while another acts as a "backup" battery and serves to provide power to complete a transaction that was started using power from the main battery if the main battery becomes depleted or stops working due to a disconnected/poor electrical connection, a short circuit, or a battery defect.

Two transaction object readers 107 and corresponding card slot interfaces are depicted in the POS device 205 of FIG. 2. In particular, a card insertion slot 220 is included in the POS device 205, allowing insertion of an IC chip card having an IC chip, such as an EMV chip. Transaction information is read from this IC chip by the IC chip reader 225 and then transmitted on to the processor 105, optionally being encrypted at the transaction object (the IC chip card), at the IC chip reader 225, at the processor 105, or some combination thereof. A card swipe slot 230 is depicted, through which a magnetic stripe card having a magnetic stripe may be swiped. In some cases one or more "swiper walls" may be included along the sides of the card swipe slot 230 to keep the card in the card swipe slot 230 during the duration of the swipe. Transaction information is read from this magnetic stripe by the magnetic stripe reader 235 and then transmitted on to the processor 105, optionally being encrypted at the transaction object (the magnetic stripe card), at the magnetic stripe reader 235, at the processor 105, or some combination thereof. An NFC antenna may also be included within the POS device, though it is not shown. Transaction information is read from an NFC-capable object by the NFC antenna and then transmitted on to the processor 105, optionally being encrypted at the transaction object (the NFC-capable object), at the NFC antenna, at the processor 105, or some combination thereof. In some cases, the NFC antenna and the IC chip reader 225 may share a contactless antenna.

The POS device 205 of FIG. 2 may include one or more processor(s) 265, including the processor 105 depicted in FIG. 1. Each of the one or more processor(s) 265 may be any type of processor 510 discussed with respect to FIG. 5. Each of the one or more processor(s) 265 may be connected to its own memory 520, mass storage 530, portable storage 540, output devices 550, input devices 560, or any other component discussed with respect to FIG. 5; alternately, some of the one or more processor(s) 265 may share such components.

In some cases, the POS device 205 may include one or more secondary processor(s) in addition to the processor 105, for example to distribute different processes or control of different components to different processors. These secondary processor(s) may include secure processor(s) that are connected to the transaction object reader(s) 107, where the secure processor(s) handle encryption of the transaction information before that transaction information reaches the main processor 105. These secure processor(s), along with components of the transaction object reader(s) 107, may be housed in a secure enclosure within the POS device 205, where the secure enclosure includes tamper detection circuitry that may be connected to the secure processor(s) and/or to the main processor 105. The tamper detection circuitry may include multiple voltage sensors within a tamper detection circuit that includes conductive tamper traces lining one or more surfaces of the secure enclosure, so that any break in the tamper traces, or any short circuit caused by connecting two tamper traces, can be detected. In this way, the tamper detection circuit, and therefore the one or more processor(s) 265, can detect if someone has attempted to tamper with the secure enclosure, for example by attempting to open the secure enclosure, by drilling into a side of the secure enclosure, by attempting to damage or disable the secure enclosure, or by flooding the secure enclosure with a conductive fluid. Some input components that may receive sensitive information such as Personal Identification Number (PIN) codes, signatures, or biometric data may also be enclosed in the secure enclosure, as may be any memory or data storage components that store symmetric or asymmetric encryption/decryption security keys for encrypting and/or decrypting transaction information. These input components may include touch-sensitive layer components of the touch-sensitive display screen 210, biometric sensors, or a physical keypad.

It should be understood that any operation discussed herein as being performed by the processor 105 can alternately or additionally be performed by any combination of the one or more processor(s) 265, such as the secure processor(s) discussed above.

A touch-sensitive display screen 210 is illustrated as a component of the POS device 205, and may be secured to the POS device 205 so that it represents at least a portion of a face of the POS device 205. For example, the touch-sensitive display screen 210 may be on a top or front face of the POS device 100. The touch-sensitive display screen 210 may be on a diagonally angled face that is angled so as to be more easily viewed by a buyer user or merchant user of the POS system 205. The touch-sensitive display screen 210 may be curved and may be on a curved face that is angled so as to be more easily viewed by a buyer user or merchant user of the POS system 205. In some cases, the touch-sensitive display screen 210 may be mounted to the POS system 100 in such a way that the angle of the display with respect to a housing for the rest of the POS device 205 may be adjusted by a buyer user or merchant user of the POS system 100, for example allowing swiveling along one or two rotation axes. The touch-sensitive display screen 210 may also optionally be mounted to the POS system 205 in such a way as to allow rotation of the touch-sensitive display screen 210 as well, for example to rotate from a portrait mode to a landscape mode or vice versa, or to rotate from a merchant-facing orientation to a buyer-facing orientation. The touch-sensitive display screen 210 may be connected to the processor 105 and optionally to the microcontroller 195, and may display, for example, a user interface of a financial transaction application run via the processor 105 by executing financial transaction application instructions stored in a memory of the POS device 205. The touch-sensitive display screen 210 may use any type of display discussed in reference to the display system 570 of FIG. 5, and may use capacitive touch sensing, resistive touch sensing, inductive touch sensing, or some combination thereof. For example, the touch-sensitive display screen 210 may utilize a Indium Tin Oxide (ITO) touch-sensitive layer or a printed ink touch-sensitive layer.

A receipt 240 is illustrated being output of a top-rear edge of the POS device 205. This receipt 240 is output by a printer 180 illustrated FIG. 2. The POS device 205 also includes a speaker 215 for outputting audio. Such audio can be associated with the financial transaction application, and can for example be output to indicate a successful transaction, to indicate a failed transaction, to indicate that a card or other transaction object should be presented/inserted/swiped, to indicate that a card or other transaction object should be removed, to indicate that a user input such as a PIN code must be input via the touch-sensitive display screen 210, to indicate that an input via the touch-sensitive display screen 210 has been received, or some combination thereof.

The perspective view of the POS device 205 illustrates the printer 180 in the the POS device 105, where the printer 180 is printing the receipt 240 that is also visible in FIG. 2. A roll of paper is visible through an open side face of the printer 180 in FIG. 2. The paper may be thermal paper, contact paper, photo paper, or other specialized paper as required by the printer 180. In some cases, one or more face(s) of the POS device 205 may include doors (not shown) that open and close, for example enabling paper, ink, and/or toner to be easily replaced in the printer 180, or enabling one or more batterie(s) 260 to be easily replaced.

The perspective view of the POS device 205 also shows an external connector 192, namely a USB type-C port. The POS device 205 may also or alternatively include at least one of a Bluetooth®, Bluetooth® Low Energy (BLE), or Wi-Fi antenna internally to serve as external connectors 192.

The perspective view of the POS device 205 also shows an audio jack 240. The audio jack 240 may allow headphones or external speakers to be plugged into the POS device 205 to provide an alternative or additional audio output device to output the audio that the speakers 215 can output. Other peripherals, such as card readers or NFC readers, may alternatively be connected via the audio jack 240. The audio jack 240 may in some cases act as an external connector 192.

The POS device 205 may also include a power button 250 that can be used to whether or not power is conveyed to the processor 105, the touch-sensitive display screen 210, the transaction object reader(s) 107, and/or other elements of the POS device 205. The POS device 205 may be powered by the batterie(s) 260 discussed above, a connection to a power outlet, or some combination thereof. The connection to the power outlet or other power source may be made through the external connector 192, the audio jack 240, a separate power port (not illustrated), or some combination thereof, and may charge the batterie(s) 260 and/or power at least a subset of the components of the POS device 205.

The POS device 205 may include one or more wireless antennae 270, which may include the wireless transceiver 185. The one or more wireless antennae 270 may include, for example, a 802.11 Wi-Fi antenna, a WLAN/WWAN antenna, a Bluetooth® antenna, a Bluetooth® Low Energy (BLE) antenna, a cellular network antenna, a NFC antenna, a radio frequency identification (RFID) antenna, an antenna for any other type of communication discussed with respect to FIG. 5, or some combination thereof.

The POS device 205 may include one or more sensors 275, whose measurements may be fed into the processor 105 or any other processor(s) 265. The sensors 275 may include a temperature sensor for detecting high temperatures, which may indicate overheating and/or for detecting low temperatures, which may increase undervoltage risk, since batteries often do not function as well in low temperatures. The sensors 275 may include a camera (visible, infrared, ultraviolet, or some combination thereof) or ambient light sensor, which may for example be used to adjust the brightness and/or backlight brightness of the touch-sensitive display screen 210 to match its surroundings, so that brightness is increased where surroundings are bright to improve visibility, and so that brightness is decreased where surroundings are dim to avoid eyestrain. The sensors 275 may include biometric sensors, such as fingerprint scanners, palm scanners, iris/facial recognition detection (using one or more cameras), voiceprint recognition (using one or more microphones), blood sensors, DNA sensors, or some combination thereof. Data from biometric sensors may be encrypted along with transaction information or separately, and may be verified (by the POS device 205 or by a remote server) against a database stored at the POS device 205 or at another device remote from the POS device 205.

The POS device 205 may in some cases include additional ports or components not shown in the figures, such as an Ethernet port for wired networking capabilities, a SIM card slot and cellular antenna for cellular networking capabilities, or any other component illustrated in FIG. 5 or identified in the description of FIG. 5.

FIG. 3A is a flow diagram illustrating a switch from using a processor of a point-of-sale (POS) device in a host role to using a secondary device in the host role.

At step 305, the first switch 110 connects the processor 105 to the host connector 140 of the internal USB hub 130 via the first throw connector 120 of the first switch 110, and the second switch 160 connects the external connector controller 190 to the first peripheral connector 145 of the internal USB hub 130 via the first throw connector 170 of the second switch 160.

At step 310, the processor 105 acts as the host to the peripheral device(s) connected to the internal USB hub 130, for example those connected to the first peripheral connector 145, the second peripheral connector 150, and the third peripheral connector 155 of FIG. 1. This may include the secondary device 197 if it has already been connected to the external connector 192 but remains in the primary mode. The internal USB hub 130 may have more or fewer peripheral connectors than the three illustrated in FIG. 1.

At step 315, a secondary device connector associated with the secondary device 197 is connected to the external connector 192. The secondary device connector may be a port, a plug, a cable, a wireless signal antenna, a wireless signal, or some combination thereof. An example of a secondary device connector in the form of a USB cable 420 is illustrated in FIG. 4. In some cases, step 315 may come before step 305 and/or step 310.

At step 320, the microcontroller 195 identifies that the secondary device 197 is capable of acting as a host in the internal USB hub 130 or in a USB connection generally, and that it would be safe for the secondary device 197 to act as a host in the internal USB hub 130 or in a USB connection generally. The microcontroller 195 can do this via the negotiations, identifiers, keys, certificate signatures, whitelists, and/or blacklists discussed in relation to FIG. 1.

At optional step 325, the processor 105 may receive a switch request input from the secondary device 197, from the external connector controller 190, from the microcontroller 192, from an input interface such as any discussed in reference to input devices 560 of FIG. 5, or some combination thereof.

At step 330, the processor 105 transmits a first control signal to the control pin 115 of the first switch. The processor 105 also transmits a second control signal to the control pin 165 of the second switch 160. Step 330 may in some cases be triggered by the switch request input of step 325.

At step 335, the first switch 110 connects the processor 105 to the first peripheral connector 145 of the internal USB hub 130 via the second throw connector 125 of the first switch 110, and the second switch 160 connects the external connector controller 190 to the host connector 140 of the internal USB hub 130 via the second throw connector 175 of the second switch 160.

At optional step 340, the processor 105 transmits a reset signal to the reset pin 135 of the interior USB hub 130. Though optional step 340 is illustrated between step 335 and step 345, it may also or alternately occur between step 320 and step 330, between step 330 and step 335, some combination thereof, or not at all.

At step 345, the secondary device 197 acts as the host to the peripheral device(s) connected to the internal USB hub 130, for example those connected to the first peripheral connector 145, the second peripheral connector 150, and the third peripheral connector 155 of FIG. 1.

Figure 3B:
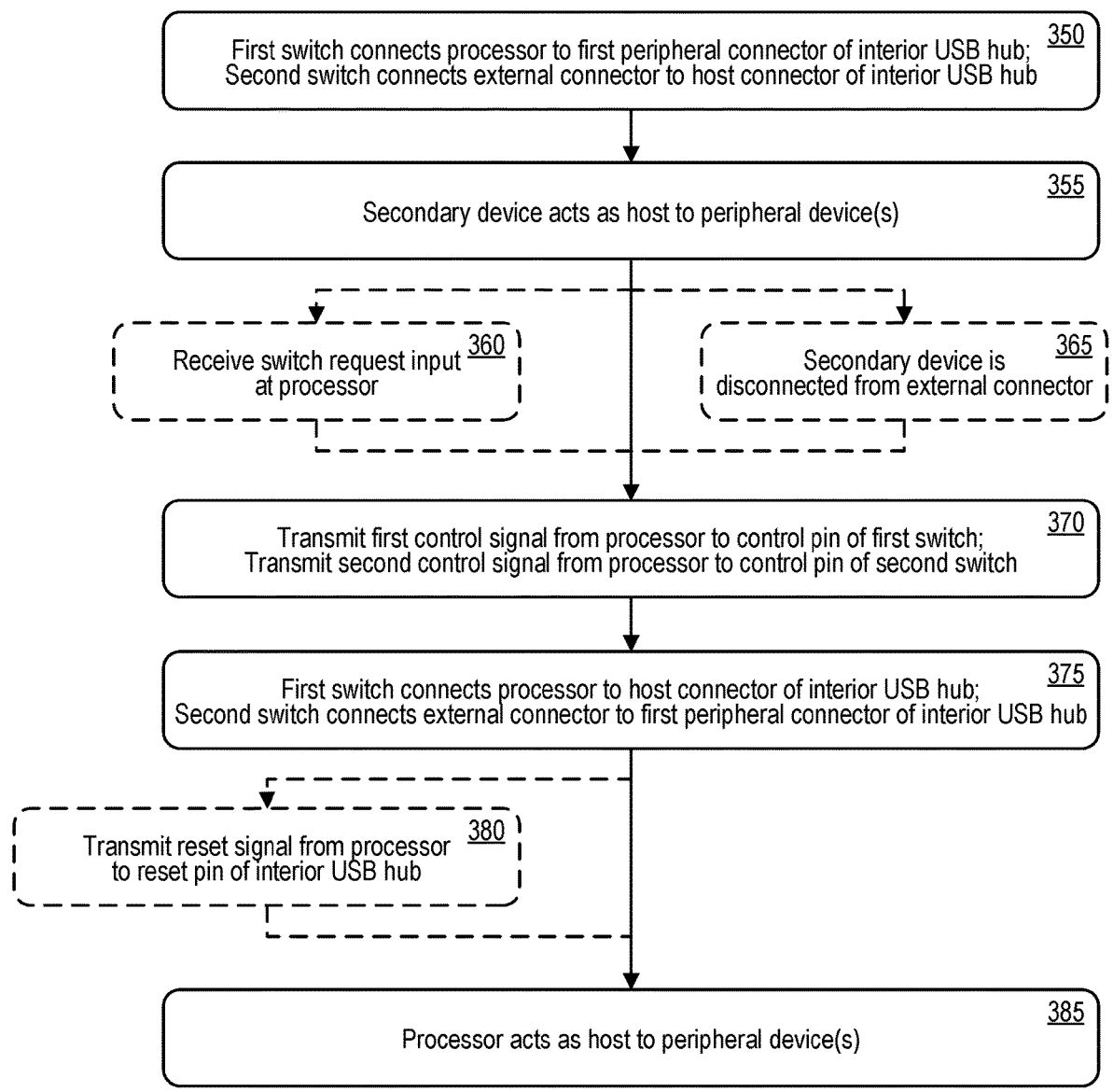
FIG. 3B is a flow diagram illustrating a switch from using a secondary device in a host role to using a processor of a point-of-sale (POS) device in the host role.

FIG. 3B is a flow diagram illustrating a switch from using a secondary device in a host role to using a processor of a point-of-sale (POS) device in the host role.

At step 350, the first switch 110 connects the processor 105 to the first peripheral connector 145 of the internal USB hub 130 via the second throw connector 125 of the first switch 110, and the second switch 160 connects the external connector controller 190 to the host connector 140 of the internal USB hub 130 via the second throw connector 175 of the second switch 160.

At step 355, the secondary device 197 acts as the host to the peripheral device(s) connected to the internal USB hub 130, for example those connected to the first peripheral connector 145, the second peripheral connector 150, and the third peripheral connector 155 of FIG. 1. This may include the processor 105, which should be connected to the first peripheral connector 145 in this second mode.

At optional step 360, the processor 105 may receive a switch request input from the secondary device 197, from the external connector controller 190, from the microcontroller 192, from an input interface such as any discussed in reference to input devices 560 of FIG. 5, or some combination thereof.

At optional step 365, the secondary device may be disconnected from the external connector 192, such as by being unplugged or by disabling a wireless connection.

At step 370, the processor 105 transmits a first control signal to the control pin 115 of the first switch. The processor 105 also transmits a second control signal to the control pin 165 of the second switch 160. Step 350 may in some cases be triggered by the switch request input of optional step 360 and/or the disconnection of optional step 365.

At step 375, the first switch 110 connects the processor 105 to the host connector 140 of the internal USB hub 130 via the first throw connector 120 of the first switch 110, and the second switch 160 connects the external connector controller 190 to the first peripheral connector 145 of the internal USB hub 130 via the first throw connector 170 of the second switch 160.

At optional step 380, the processor 105 transmits a reset signal to the reset pin 135 of the interior USB hub 130. Though optional step 380 is illustrated between step 335 and step 345, it may also or alternately occur between step 355 and step 370, between step 370 and step 375, some combination thereof, or not at all.

At step 385, the processor 105 acts as the host to the peripheral device(s) connected to the internal USB hub 130, for example those connected to the first peripheral connector 145, the second peripheral connector 150, and the third peripheral connector 155 of FIG. 1. This may include the secondary device 197 if it remains connected to the external connector 192 despite the move back to the primary mode.

FIG. 4 illustrates a primary point-of-sale (POS) device connected to a secondary point-of-sale (POS) device.

The POS devices 205 of FIG. 4 are the same POS devices 205 of FIG. 2. The POS devices 205 may include at least a subset of the circuitry illustrated in FIG. 1 or discussed with respect to FIG. 1, and optionally may include at least a subset of the circuitry illustrated in FIG. 5 or discussed with respect to FIG. 5.

The setup of FIG. 4 includes a primary device 405 connected to a secondary device 197, where both the primary device 405 and the secondary device 197 are POS devices 205. The two POS devices 205 are connected via each other's external connectors 192, which in this case are USB ports, and via a secondary device connector 420, which is a male-to-male USB cable.

One use for connecting two POS devices 205 could be to have the secondary device 197 update the software or firmware of the primary device 405 by having the secondary device 197 assume a host role and transfer new software or firmware to the microcontroller 195 of the primary device 405. For serious updates like a firmware update or an operating system update, the microcontroller 195 of the primary device 405 can trigger EDL mode in the processor 105 of the primary device 105, while smaller updates, like an update to the financial transaction application, might not require use of EDL mode.

Another use for connecting two POS devices 205 could be to allow the secondary device 197 to use peripherals, such as the printer 180 or wireless transceiver 185, of the primary device 405. This could be used to replace, complement, or supplement existing components in the secondary device 197. For example the printer 180 of the primary device 405 could be used to replace a faulty printer in the secondary device 197, to complement an existing printer in the secondary device 197 to allow the secondary device 197 to print twice as quickly by using both printers, or to supplement printer functionality to a secondary device 197 that never had a printer to begin with. The wireless transceiver 185 or other possible peripheral components, such as bar code scanners or cameras or light sensors or storage devices, could be used similarly.

The secondary device 197 need not be a POS device 205 and may be any type of computer system 500 described with respect to FIG. 5.

FIG. 5 illustrates an exemplary computing system 500 that may be used to implement an embodiment of the present invention. For example, any of the computer systems or computerized devices described herein may include at least one computing system 500, or may include at least one component of the computer system 500 identified in FIG. 5. The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

The memory 520, mass storage device 530, or portable storage 540 may in some cases store sensitive information, such as transaction information, health information, or cryptographic keys, and may in some cases encrypt or decrypt such information with the aid of the processor 510. The memory 520, mass storage device 530, or portable storage 540 may in some cases store, at least in part, instructions, executable code, or other data for execution or processing by the processor 510.

Output devices 550 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 570. The printer may be inkjet, laserjet, thermal, or some combination thereof. In some cases, the output device circuitry 550 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, WLAN/WWAN wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 550 may include any ports, plugs, antennae, or any other components necessary for the communication types listed above, such as cellular SI Subscriber Identity Module (SIM) cards.

Input devices 560 may include circuitry providing a portion of a user interface. Input devices 560 may include an alpha-numeric keypad, such as a keyboard, for inputting alpha-numeric and other information, or a pointing device, such as a mouse, a trackball, stylus, or cursor direction keys. Input devices 560 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, WLAN/WWAN signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 560 may include any ports, plugs, antennae, or any other components necessary for the communication types listed above, such as cellular SIM cards.

Display system 570 may include a liquid crystal display (LCD), a plasma display, an organic light-emitting diode (OLED) display, an electronic ink or "e-paper" display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 500 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 500 may be part of a multi-computer system that uses multiple computer systems 500, each for one or more specific tasks or purposes. For example, the multi-computer system may include multiple computer systems 500 communicatively coupled together via at least one of a personal area network (PAN), a local area network (LAN), a wireless local area network (WLAN), wireless wide area network (WWAN), a municipal area network (MAN), a wide area network (WAN), or some combination thereof. The multi-computer system may further include multiple computer systems 500 from different networks communicatively coupled together via the internet (also known as a "distributed" system).

The present invention may be implemented in an application that may be operable using a variety of devices. Non-transitory computer-readable storage media refer to any medium or media that participate in providing instructions to a central processing unit (CPU) for execution and that may be used in the memory 520, the mass storage 530, the portable storage 540, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, any other magnetic medium, flash memory, memristor memory, any other solid-state memory, a CD-ROM disk, digital video disk (DVD), blu-ray disk (BDD), or any other optical medium, Random Access Memory (RAM), Read-Only Memory (ROM), programmable read-only memory (PROM), erasable programmable read-only memory (EPROM), electrically erasable programmable read-only memory (EEPROM), FLASHEPROM, Resistive random-access memory (RRAM or ReRAM), Phase Change Memory (PCM), spin transfer torque RAM (STT-RAM), and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A point-of-sale (POS) system with switchable connection roles, the system comprising:
   a housing;
   an external connector disposed at least partially within the housing, wherein the external connector is configured to connect to a secondary device outside of the housing;
   a transaction object reader disposed at least partially within the housing, the transaction object reader configured to read transaction data from a transaction object, the transaction object reader configured to send the transaction data to a processor;
   the processor disposed within the housing, wherein the processor is configured to receive the transaction data and transmit the transaction data via a network transceiver to a payment processor server that conducts a transaction between a buyer and a merchant based on the transaction data, wherein the processor is configured to provide a first control signal to a control pin of a first switch and a second control signal to a control pin of a second switch in response to connection of the secondary device to the external connector;
   the network transceiver disposed at least partially within the housing;
   a universal serial bus (USB) hub disposed within the housing, wherein the USB hub includes a host connector and a plurality of peripheral connectors, wherein the plurality of peripheral connectors includes a first peripheral connector;
   the first switch disposed within the housing, wherein the first switch is configured to switch between connecting the processor to the host connector of the USB hub and connecting the processor to the first peripheral connector of the USB hub based on receipt of the first control signal from the processor at the control pin of the first switch; and
   the second switch disposed within the housing, wherein the second switch is configured to switch between connecting the external connector to the first peripheral connector of the USB hub and connecting the external connector to the host connector of the USB hub based on receipt of the second control signal from the processor at the control pin of the second switch.

2. The POS system of claim 1, further comprising a touch-sensitive display screen disposed at least partially within the housing.

3. The POS system of claim 1, further comprising a microcontroller disposed within the housing, the microcontroller connected to the external connector and the processor, wherein the microcontroller is configured to negotiate with the secondary device via the external connector to identify that a role change is safe, wherein the microcontroller is configured to trigger the processor to provide the first control signal and the second control signal and the reset signal in response to identifying that the role change is safe.

4. A system for switchable connection roles, the system comprising:
   a housing;
   an external connector at least partially within the housing, wherein the external connector is configured to connect to a secondary device outside of the housing;
   a processor within the housing, wherein the processor is configured to provide a first control signal to a first switch and a second control signal to a second switch in response to connection of the secondary device to the external connector;

a universal serial bus (USB) hub within the housing, wherein the USB hub includes a host connector and a plurality of peripheral connectors, wherein the plurality of peripheral connectors includes a first peripheral connector;

a first switch within the housing, wherein the first switch is configured to switch between connecting the processor to the host connector of the USB hub and connecting the processor to the first peripheral connector of the USB hub based on receipt of the first control signal from the processor; and a second switch within the housing, wherein the second switch is configured to switch between connecting the external connector to the first peripheral connector of the USB hub and connecting the external connector to the host connector of the USB hub based on receipt of the second control signal from the processor.

5. The system of claim 4, wherein the processor is configured to provide the first control signal to the first switch and to provide the second control signal to the second switch within a single period of time of a predetermined duration.

6. The system of claim 5, wherein the USB hub includes a reset pin, wherein the processor is configured to provide a reset signal to the reset pin of the USB hub within the single period of time, thereby triggering a reset at the USB hub.

7. The system of claim 4, wherein the external connector is one of a USB connector, a wireless Bluetooth® connector, or a wireless Bluetooth® Low Energy (BLE) connector.

8. The system of claim 4, further comprising a microcontroller within the housing, wherein the microcontroller is connected to the external connector and the processor, wherein the microcontroller is configured to negotiate with the secondary device via the external connector to identify that a role change is safe, wherein the microcontroller is configured to trigger the processor to provide the first control signal and the second control signal in response to identifying that the role change is safe.

9. The system of claim 8, wherein identifying that the role change is safe includes at least one of exchanging one or more key codes between the microcontroller and the secondary device, identifying an identifier of the secondary device, identifying a device class of the secondary device, identifying a component of the secondary device, or identifying a capability of the secondary device.

10. The system of claim 8, wherein the microcontroller is configured to trigger an emergency download (EDL) mode in the processor.

11. The system of claim 8, wherein the external connector is a USB connector, and wherein microcontroller is configured to negotiate with the secondary device via at least one of a Side Band Use (SBU) signal or a Vendor Defined Message (VDM) signal.

12. The system of claim 4, wherein the first switch includes at least one of a first multiplexer or a first demultiplexer, and wherein the second switch includes at least one of a second multiplexer or a second demultiplexer.

13. The system of claim 4, further comprising a magnetic stripe reader at least partially within the housing, the magnetic stripe reader configured to read transaction data from a magnetic stripe of a transaction card, the magnetic stripe reader configured to send the transaction data to the processor, wherein the processor is configured to receive the transaction data and transmit the transaction data via a network transceiver to a payment processor server that conducts a transaction between a buyer and a merchant based on the transaction data.

14. The system of claim 4, further comprising an integrated circuit (IC) chip reader at least partially within the housing, the IC chip reader configured to read transaction data from an IC chip of a transaction card, the magnetic stripe reader configured to send the transaction data to the processor, wherein the processor is configured to receive the transaction data and transmit the transaction data via a network transceiver to a payment processor server that conducts a transaction between a buyer and a merchant based on the transaction data.

15. The system of claim 4, further comprising a near field communication (NFC) object reader at least partially within the housing, the NFC object reader configured to read transaction data from an NFC object, the NFC object reader configured to send the transaction data to the processor, wherein the processor is configured to receive the transaction data and transmit the transaction data via a network transceiver to a payment processor server that conducts a transaction between a buyer and a merchant based on the transaction data.

16. The system of claim 4, wherein the plurality of peripheral connectors include a second peripheral connector connected to a printer.

17. The system of claim 4, wherein the plurality of peripheral connectors include a second peripheral connector connected to a wireless network transceiver configured to connect to a network via one of a Wi-Fi connection or a cellular phone connection.

18. A method for switching connection roles, the method comprising:
    connecting a first processor of a point-of-sale (POS) device to a host connector of a universal serial bus (USB) hub of the POS device via a first switch of the POS device;
    connecting an external connector of the POS device to a first peripheral connector of the USB hub of the POS device via a second switch of the POS device;
    receiving a secondary device connector at the external connector of the POS device, the secondary device connector connecting the external connector to a secondary device having a second processor;
    transmitting one or more control signals from the first processor of the POS device to the first switch and the second switch in response to receipt of the secondary device connector at the external connector of the POS device;
    connecting the first processor of the POS device to the first peripheral connector of the USB hub via the first switch in response to transmission of the one or more control signals by the first processor; and
    connecting the external connector of the POS device to the host connector of the USB hub via the second switch in response to transmission of the one or more control signals by the first processor.

19. The method of claim 18, further comprising transmitting a reset signal from the processor of the POS device to a reset pin of the USB hub, thereby triggering a reset at the USB hub.

20. The method of claim 18, further comprising receiving a switch request input at the processor, wherein transmitting the first control signal from the processor of the POS device to the control pin of the first switch of the POS device is in response to receipt of the switch request input at the processor, and wherein transmitting the second control signal from the processor of the POS device to the control pin of the second switch of the POS device is in response to receipt of the switch request input at the processor.

* * * * *